(12) United States Patent
Nommensen et al.

(10) Patent No.: US 7,309,940 B2
(45) Date of Patent: Dec. 18, 2007

(54) ROTOR ARRANGEMENT FOR AN ELECTRICAL DRIVE MOTOR OF A COMPRESSOR, PARTICULARLY A REFRIGERANT COMPRESSOR

(75) Inventors: Marten Nommensen, Flensburg (DE); Frank Holm Iversen, Padborg (DK); Heinz Otto Lassen, Flensburg (DE); Christian Petersen, deceased, late of Hattstedt (DE); by Beate Sönksen, legal representative, Hattstedt (DE)

(73) Assignee: Danfoss Compressors GmbH, Flensburg (DE)

( * ) Notice: Subject to any disclaimer, the term of this patent is extended or adjusted under 35 U.S.C. 154(b) by 331 days.

(21) Appl. No.: 11/125,953

(22) Filed: May 10, 2005

(65) Prior Publication Data

US 2005/0275305 A1    Dec. 15, 2005

(30) Foreign Application Priority Data

May 19, 2004    (DE) .................... 10 2004 025 313

(51) Int. Cl.
*H02K 1/00*    (2006.01)
(52) U.S. Cl. ........................ 310/216; 310/261
(58) Field of Classification Search ........ 310/216–218, 310/261
See application file for complete search history.

(56) References Cited

U.S. PATENT DOCUMENTS 3,597,835 A * 8/1971 Scaillet et al. ............. 29/598
3,650,022 A * 3/1972 Stone ........................ 29/598
4,215,287 A * 7/1980 Otto .......................... 310/217
5,445,504 A * 8/1995 Iwamura et al. ............ 417/368
5,767,607 A * 6/1998 Kieffer ...................... 310/261
6,097,115 A * 8/2000 Tevaarwerk et al. ........ 310/51
6,265,802 B1 * 7/2001 Getschmann ............... 310/216
6,781,274 B2 * 8/2004 Lee ........................... 310/216
6,933,693 B2 * 8/2005 Schuchmann .............. 318/432
7,103,961 B2 * 9/2006 Fujita ......................... 29/596

FOREIGN PATENT DOCUMENTS

| FR | 962 064 | 5/1950 |
| JP | 1016240 | 1/1989 |
| JP | 3285530 | 12/1991 |

* cited by examiner

*Primary Examiner*—Thanh Lam
(74) *Attorney, Agent, or Firm*—McCormick, Paulding & Huber LLP

(57) ABSTRACT

The invention concerns a rotor arrangement for an electrical drive motor of a compressor, particularly a refrigerant compressor, with a rotor having a rotor lamination of stacked sheet plates, and a shaft, which is inserted in an axial recess of the rotor lamination and is unrotatably connected with the rotor lamination, the recess being formed by openings in adjacent sheet plates. It is endeavoured to simplify the manufacturing of such rotor arrangements. For this purpose, it is ensured that openings of different sizes are provided in the sheet plates, at least two sheet plates forming a first group, each having an opening, which is smaller than the cross-section of the shaft, the remaining sheet plates forming a second group, each having an opening, which is larger than the cross-section of the shaft.

9 Claims, 4 Drawing Sheets

Page 1

ROTOR ARRANGEMENT FOR AN ELECTRICAL DRIVE MOTOR OF A COMPRESSOR, PARTICULARLY A REFRIGERANT COMPRESSOR

CROSS-REFERENCE TO RELATED APPLICATIONS

Applicant hereby claims foreign priority benefits under U.S.C. § 119 from German Patent Application No. 10 2004 025 313.7, filed on May 19, 2004 the contents of which are incorporated by reference herein.

FIELD OF THE INVENTION

The invention concerns a rotor arrangement for an electrical drive motor of a compressor, particularly a refrigerant compressor.

BACKGROUND OF THE INVENTION

In refrigerant compressors, which are usually applied in household refrigeration appliances, like refrigerators and freezers, the most frequently used motors are asynchronous motors with a stator and an internal squirrel-cage rotor, which forms the rotor. This rotor mainly consists of a rotor lamination. This rotor lamination may have grooves, which are filled, for example by means of moulding, with an electrically conducting material, for example aluminium. The conductors formed in this way are connected at both axial ends by means of a short-circuit ring. In the radial centre of the rotor lamination is provided the recess, which adopts the shaft. Initially, the recess is formed in that the sheet plates forming the rotor lamination have a central opening. This opening can, for example, be made by punching. In order to connect the rotor lamination with the shaft in a tensionally locked manner, different processes are possible. For example, the rotor lamination can be pressed, shrunk or glued onto the shaft. As, however, it is required to locate the shaft as close to the centre as possible, which means that subsequently the air gap in the motor can be kept as small as possible, the fitting tolerances in connection with such processes must be very strictly observed. This makes it necessary to work the recess of the rotor lamination. Thus, firstly the rotor lamination must be finished and provided with the required conductors, if available. Then, the recess must be worked, which in the simplest case requires a boring process.

SUMMARY OF THE INVENTION

The invention is based on the task of simplifying the manufacturing of a rotor arrangement.

With a rotor arrangement as mentioned in the introduction, this task is solved in that openings of different sizes are provided in the sheet plates, at least two sheet plates forming a first group, each having an opening, which is smaller than the cross-section of the shaft, the remaining sheets forming a second group, each having an opening, which is larger than the cross-section of the shaft.

This causes that the connection between the rotor lamination and the shaft only occurs at the sheet plates of the first group. It has turned out that this is usually sufficient to ensure an unrotatable connection. As the first group has at least two sheet plates, the support of the rotor lamination on the shaft occurs at two axially offset positions. Thus, the rotor is stably located in relation to the shaft, that is, it cannot tilt. For mounting the rotor on the shaft, only the sheet plates of the first group have to be deformed. The sheet plates of the second group have practically no contact with the shaft. This means that they provide no holding force between the rotor and the shaft. However, this also means that a working of the sheet plates of the second group is not required. Also the sheet plates of the first group do not have to be worked, as the openings, whose cross-section is smaller than the cross-section of the shaft can be made with sufficient accuracy by means of punching. This accuracy does not have to be as high as the tolerances, which have until now been required in connection with pressing or shrinking of the massive rotor lamination. With the sheets of the first group, a sufficient position tolerance between the outer diameter and the inner diameter of the rotor lamination and thus a good concentric run of the motor can be ensured. This enables a reduction of the air gap between the rotor and the stator, which again improves the efficiency of the motor. It is not either required to heat up the rotor, which was usually required in connection with the shrinking. This saves time and cost during mounting. Also rotors with permanent magnets can be used, which usually cannot stand heating.

As pressing the sheet plate rotor lamination onto the shaft requires less force, also weaker shafts can be used. For example, shafts can be used, which are made of a pipe coiled from a sheet plate. This keeps the weight of the compressor and particularly the weight of moving parts small.

Preferably, at least the openings in the sheet plates of the first group and the cross-section of the shaft are circular. This simplifies the manufacturing. It no longer has to be ensured that the rotor lamination and the shaft are mounted at a predetermined angular orientation in relation to each other. In principle, the shaft can be inserted in the rotor lamination at any angular position.

It is also advantageous that the openings in the sheet plates of the first group are smaller than the shaft by a predetermined undersize, where the sheet plates are not deformed above the flow limit of the sheet plate material when pushed onto the shaft. When the rotor lamination is pushed onto the shaft, the sheet plates of the first group are deformed in the area of their central opening, as the opening is smaller than the outer diameter of the shaft. The deformation now causes that the sheet plates of the first group jam on the shaft. Thus, the sheet plates of the first group deform flexibly. Thus, the rotor is clamped on the shaft.

Preferably, the opening edges of the sheet plates in the first group are hooked on the surface of the shaft against the direction of pushing. The sheet plates in the first group are not only expanded when pushing in the shaft, but also conically deformed to a relatively limited extent. This causes that the opening edge of the sheet plates in the first group are arranged under an accordingly small angle to the circumferential face of the shaft, that is, in a manner of speaking, an opening edge cuts into the circumferential face of the shaft. In refrigerant compressors, the electrical drive motor is often provided with a vertical rotor shaft. The hooking or cutting of the sheet plates in the first group into the shaft ensures that the rotor lamination is retained on the shaft against gravity.

Preferably, sheet plates in the first group are located in the area of the axial ends of the rotor lamination. The support of the rotor lamination on the shaft thus occurs at the two points being axially farthest away from each other. This is a simple manner of ensuring that the rotor cannot tilt in relation to the shaft.

In a preferred embodiment, it is ensured that at least one sheet plated of the first group is located in the area of the axial centre of the rotor lamination. Thus, a deflection of the drive shaft during operation is counteracted.

In a particularly preferred embodiment, it is ensured that the shaft has at least one indentation, in which a sheet plate of the first group engages. This sheet plate, which can also be called "safety sheet plate", then possibly, has no or only a weakly tensionally locked connection with the shaft, compared to the other sheet plates of the first group, which can be called "connection sheet plates". When, however, the remaining sheet plates of the first group loose their tensionally locked connection with the shaft, it prevents the rotor from sliding off from the shaft. As mentioned above, electrical drive motors for refrigerant compressors are often provided with vertical rotor shaft. The sheet plate, which engages in the indentation, then forms a form-fitting protection against the rotor dropping from the shaft. Such a drop of the rotor threatens, for example, in so-called "interlocking" situations, when the compressor is turned on again immediately after turning off, without permitting the high pressure in the refrigeration system to reduce, for example during a short current failure. In this case, the motor attempts to start the compressor against the high pressure. However, usually the starting torque of the motor will not be sufficient. In this case, the current induced in the rotor can cause a very fast and heavy temperature increase in the rotor. This temperature increase may cause the inner diameter of the rotor to increase so much that the sheet plates of the first group are detached from the shaft and the rotor slides downwards. The connection of the shaft with the rotor lamination of the rotor through the sheet plates of the first group can also fail, when, in spite of applied voltage supply, the motor blocks for other reasons, for example when during the start only the main winding of the stator, however, not the auxiliary winding, is supplied with current. Also here, the safety sheet plate, which engages in the indentation of the shaft, ensures that the rotor is not detached from the shaft and falls down. On the contrary, the rotor is held by the safety sheet plate against the gravity. The lower edge area of the safety sheet plate will namely come to rest on the step face formed by the indentation in the shaft. When, after turning of the voltage supply, the rotor cools off again, the jamming connection between the rotor and the shaft will be restored to its full extent.

It is preferred that the indentation has the form of a circumferential groove. With this embodiment, a predetermined angular orientation between the rotor and the shaft must no longer be observed. The safety sheet plate can fulfil its function in any angular position.

Preferably, the indentation is located at the end of the rotor lamination, which will first overlap with the shaft. With an electrical drive motor of a refrigerant compressor, which is used with a vertical shaft and with which the shaft is inserted in the rotor from above, the indentation is thus located at the upper end of the rotor lamination. This involves the advantage that the remaining sheet plates of the first group do not have to slide across the indentation. In that case, they would first have to engage in the indentation, which would cause them to be increasingly deformed again when pushed further. In the end, this could result in a reduction of the jamming forces acting upon the shaft. When, however, the indentation only interacts with the "first" sheet plate of the first group in the mounting direction, then merely this sheet plate has to engage the indentation. The remaining sheet plates of the first group then jam on the circumference of the shaft.

Preferably, sheet plates of the first group bear on each other in pairs. When an increase of the jamming forces is to be ensured, it may be provided that, when mounting the rotor lamination on the shaft, not only one sheet plate is deformed, but always two at the same time. This requires a larger force when mounting the rotor on the shaft. However, the elastic force of the sheet plates of the first group will be substantially increased in this embodiment.

Preferably, a torque support is located between the rotor lamination and the shaft. Such a torque support can, for example, be formed by an engagement of a projection, which is formed on one or more sheet plates and projects into the opening, in an axial groove on the surface of the shaft. However, it is also possible to create a connection transferring the torque by stamping, welding, soldering or gluing. Usually, such a torque support will, however, not be required.

BRIEF DESCRIPTION OF THE DRAWINGS

In the following, the invention will be described on the basis of preferred embodiments in connection with the drawings, showing.

DETAILED DESCRIPTION OF THE PREFERRED EMBODIMENTS

Figure 1:
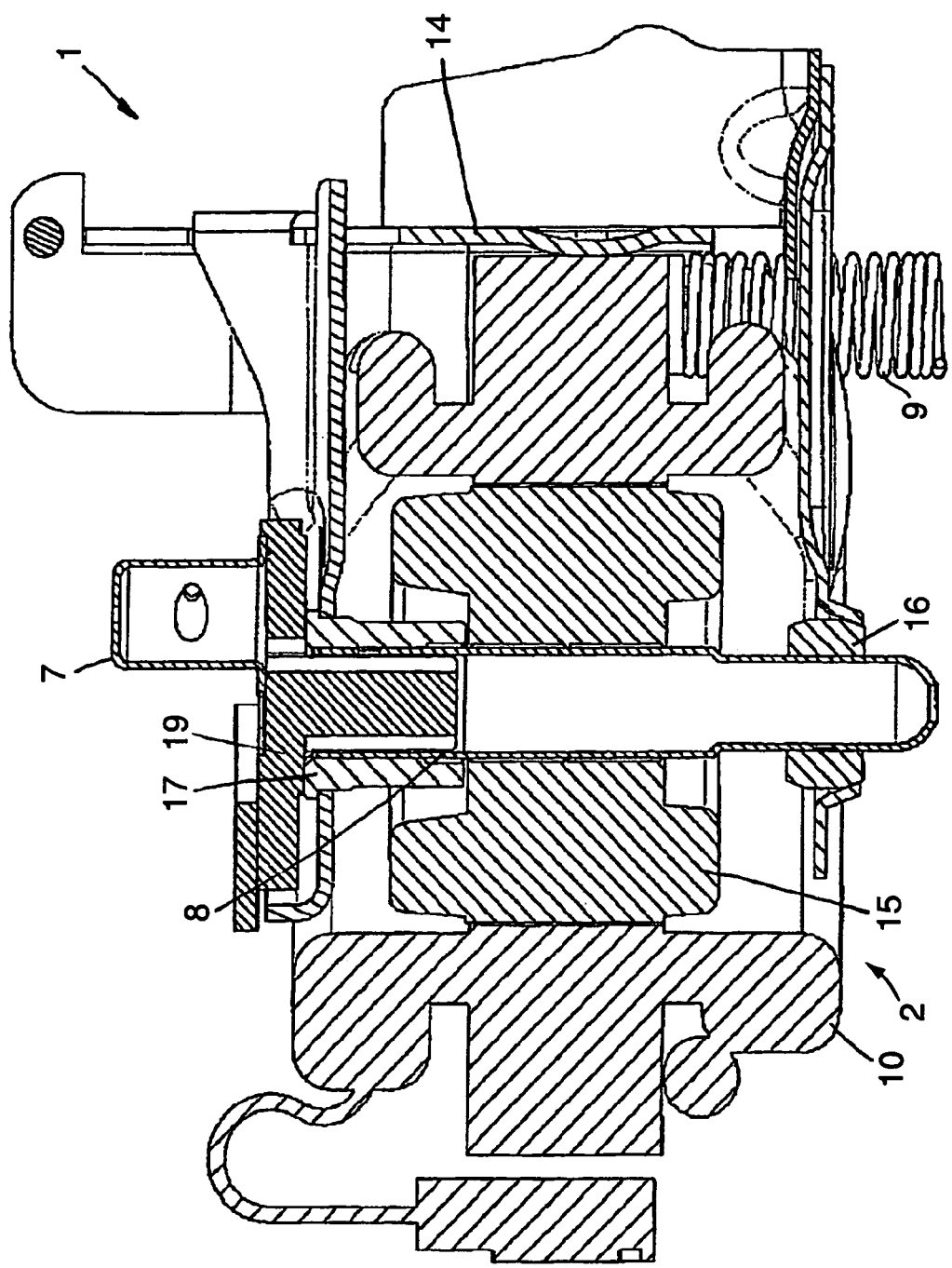
FIG. 1 is a schematic sectional view through a part of a refrigerant compressor.

FIG. 1 shows a schematic view of a refrigerant compressor, which has an electrical drive motor 2. The drive motor 2 drives a compressor, not shown in detail, which has, in a manner known per se, a cylinder, in which a piston reciprocates. Via a connecting rod, the piston is connected with a crank pin 7 of a drive shaft 8. Via springs 9, the complete refrigerant compressor 1 is connected with a hermetic compressor housing, not shown in detail. Such refrigerant compressors are frequently used in household refrigeration appliances.

When the shaft 8 turns, its turning movement is converted to a reciprocating movement of the piston by the crank pin 7.

The motor 2 has a stator 10, which supports a compressor block 14, on which the compressor is mounted. The stator 10 surrounds a rotor 15, which is unrotatably connected with the shaft 8. The shaft 8 is arranged to be vertical. On both sides of the motor 2 the shaft 8 is radially supported by a lower bearing element 16 and an upper bearing element 17. Both bearing elements 16, 17 are fixed on the compressor block 14. The upper bearing element 17 also supports the shaft 8 in the axial direction, that is, against the gravity.

When assembling the refrigerant compressor 1, firstly the compressor block 14 is connected with the stator 10 and the upper bearing element 17 is inserted. Then the shaft 8 is inserted in the bearing element 17 from above. Before mounting the lower bearing element 16, the rotor 15 must be connected with the shaft 8. For this purpose, the rotor 15 is pushed onto the shaft 8 from below. As can be seen later from the FIGS. 2 to 6, the rotor has a recess 18 in the form of a through-bore. As will be explained later, this central recess 18 has, at least in sections, a slightly smaller diameter than the outer diameter of the shaft 8. Thus, the rotor 15 is pushed onto the shaft 8, until the rotor 8 bears on the upper bearing element 17. During this mounting process, the shaft 8 is retained. It is expedient to locate a distance piece between the upper bearing element 17 and the crank disc 19 of the shaft 8, which carries the crank pin 7. After fitting the rotor 15 on the shaft 8, the distance piece is removed, and thus a certain axial distance between the rotor 15 and the upper bearing element 17 is achieved.

Figure 2:
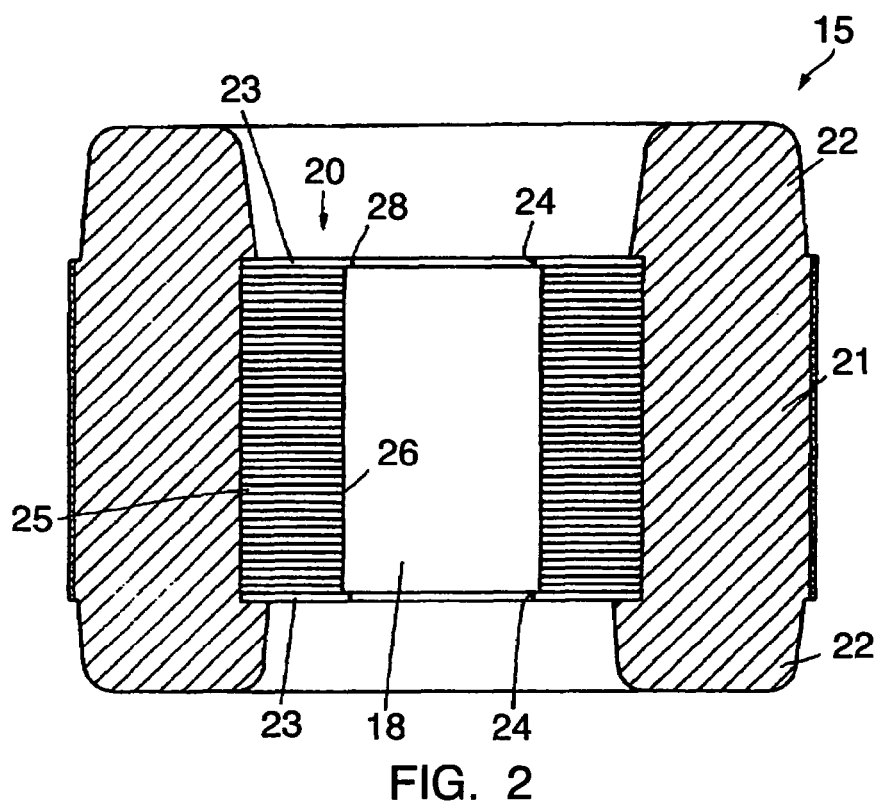
FIG. 2 is a section through a first embodiment of a rotor.

FIG. 2 now shows an enlarged view of the rotor 15. The rotor 15 has a rotor lamination 20, which is formed by a plurality of stacked sheet plates. The rotor lamination 20 has grooves, which are filled with an electrically conducting filling 21. The fillings 21 are connected with each other at the axial ends by short-circuit rings 22. Here, the fillings 21 and the short-circuit rings 22 are merely shown schematically.

The sheet plates of the rotor lamination 20 have a first group of sheet plates 23, each having a central opening 24, whose inner diameter is slightly smaller than the outer diameter of the shaft 8. Further, the rotor lamination has sheet plates 25 of a second group. Also these sheet plates have a central opening 26. This central opening has an inner diameter, which is somewhat larger than the outer diameter of the shaft 8. For reasons of clarity, the diameters of the openings 24, 26 are shown to be excessively large. When it is assumed that the shaft has a diameter in the range between approximately 10 and 20 mm, the diameter of the openings 24 is a few tenths of a millimetre smaller than the outer diameter of the shaft 8, whereas the diameter of the openings 26 is about 20 to 50 μm larger than the outer diameter of the shaft 8.

When now the rotor 15 is pushed onto the shaft 8 from below (the directions refer to the views in the figures) the rotor lamination 20 will no longer bear on the shaft 8 with its complete axial length, but only with the two sheet plates 23 of the first group. The remaining sheet plates 25 of the second group then have a small distance to the circumferential face of the shaft 8.

Figure 3:
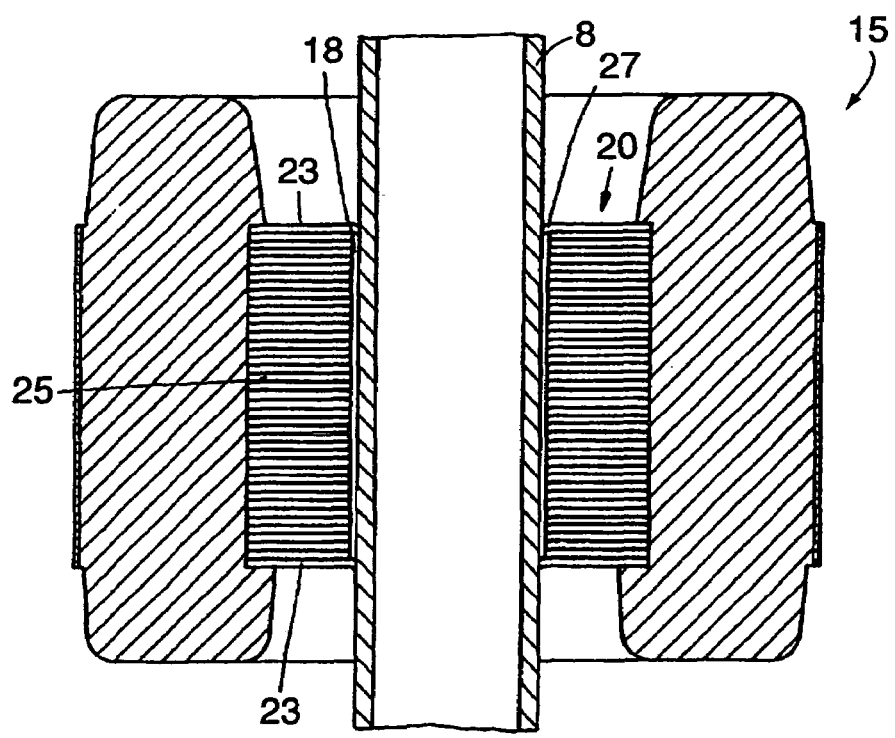
FIG. 3 is the rotor of the first embodiment with shaft.

From FIG. 3 it can be seen that the sheet plates 23 of the first group are deformed in an area 27, which bears on the shaft 8. The areas 27 of the sheets 23 are here deformed against the movement direction of the rotor 15 in a slightly "conical" manner, so that, in a manner of speaking, an upper edge 28 of the lip of the sheet plates 23 surrounding the opening 24 digs into the circumferential face of the shaft 8. The rotor lamination 20 "hooks" with the shaft 8.

The fact the rotor 15 is no longer connected with the shaft 8 on its complete inner surface and that the areas 27 of the sheet plates 23 of the first group can be deformed resiliently, reduces the mounting forces required for pushing the rotor 15 onto the shaft 8 substantially. As long as it is ensured that the sheet plates are not deformed beyond the flow limit of the sheet plates, a secure jamming is ensured. With their edge 28, the sheet plates 23 provide some kind of barbs against a movement of the rotor 15 opposite to the mounting direction.

This is particularly advantageous when using relatively thin-walled shafts 8, which could otherwise be deformed during the mounting process. Such a rotor can, however, also be used with the usually applied sintered metal shafts.

Further, with the rotor-shaft arrangement as shown, the usually required working of the inner recess 18 of the rotor 15 is not necessary, as the majority of the sheet plates, namely the sheet plates 25 of the second group do no longer get in touch with the shaft 8. This reduces the manufacturing costs.

As can be seen in FIGS. 2 and 3, the sheet plates 23 of the first group are located at the two axial ends of the rotor lamination 20. Thus, the rotor lamination 20 is supported in relation to the shaft 8 at two points, which are relatively far from each other, so that the risk of a tilting of the rotor 15 in relation to the shaft is kept small.

Also when only two sheet plates 23 of the first group are used for fixing the rotor lamination 20 on the shaft 8, the jamming forces provided by the sheet plates 23 are usually sufficient for counteracting the torsional forces caused by the starting torque of the motor.

Under unfavourable conditions, however, the motor 2 and thus also the rotor 15 can heat up relatively fast to a temperature, at which the diameter of the opening 24 increases so much that the jamming forces acting upon the shaft 8 get very small or even disappear completely. With a vertical arrangement of the shaft 8, this may cause that the rotor 15 slides off from the shaft 8. This will render the complete compressor unusable. With the usually known rotor-shaft arrangements, this is prevented by a substantially larger pressing surface and pressing force.

Figure 4:
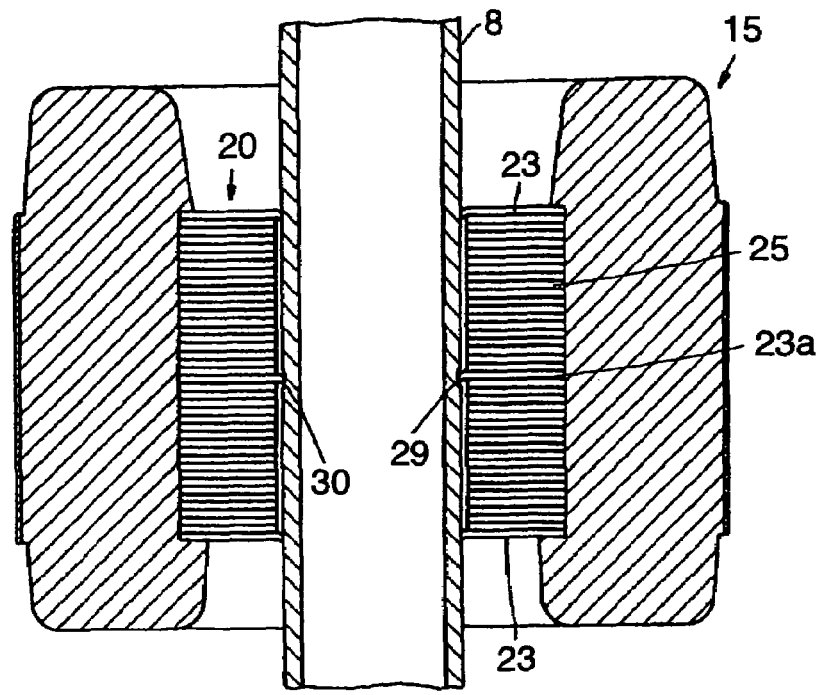
FIG. 4 is a second embodiment of a rotor with shaft.
Figure 5:
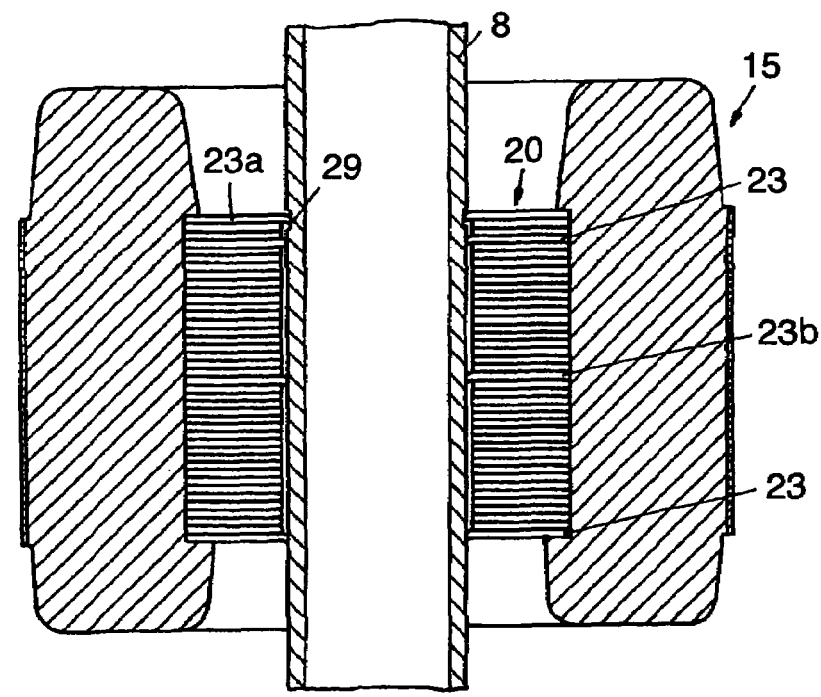
FIG. 5 is a third embodiment of a rotor with shaft.

With the shown mounting possibility of the rotor 15 on the shaft 8, this can be prevented otherwise, as shown in the FIGS. 4 and 5. Same elements have the same reference numbers as in the FIGS. 2 and 3. A further sheet plate 23a of the first group has been added, which is in the embodiment according to FIG. 4 arranged approximately in the centre. This sheet plate 23a, which could be called "safety sheet plate", engages in a recess 29 on the circumference of the shaft 8. This recess 29 can, for example, be made as a circumferential groove. The safety sheet plate 23a of the first group will provide smaller jamming forces on the shaft 8 than the remaining sheet plates 23 of the first group or even no forces at all. However, it creates a form-fitting connection with the shaft 8. When, under unfavourable conditions, the rotor 15 has been warmed up so much that the jamming forces between the sheet plates 23 and the shaft 8 disappear, the rotor 15 will slide down only so far that the safety sheet plate 23a comes to rest on a step 30, which is formed on the bottom of the recess 29. The rotor 15 is thus reliably prevented from sliding or falling off from the shaft 8.

During mounting, the first sheet plate 23 of the first group in the mounting direction must be pushed across the recess 29. This is, however, not particularly critical. During mounting the safety sheet plate 23a is shortly deformed when pushed on, however, due to its flexible properties, it more or less reassumes its original shape again, as soon as it reaches the recess 29.

In FIG. 4, the safety sheet plate 23a is located approximately in the middle of the rotor lamination 20. FIG. 5 shows an embodiment, in which the recess 29 is located at the upper end of the rotor lamination 20. In the mounting direction, the safety sheet plate 23a is thus the first sheet plate of the rotor lamination 20, so that the remaining sheet plates 23 of the first group do not have to firstly engage in the recess 29 and then, when pushed on, to be deformed heavily again. This also makes it easier to anticipate the jamming forces finally acting upon on the shaft 8.

Further, in FIG. 5 a third sheet plate 23b of the first group is provided. This sheet plate 23b is located approximately in the middle of the rotor lamination 20, which counteracts a bending of the shaft 8 during operation.

Figure 6:
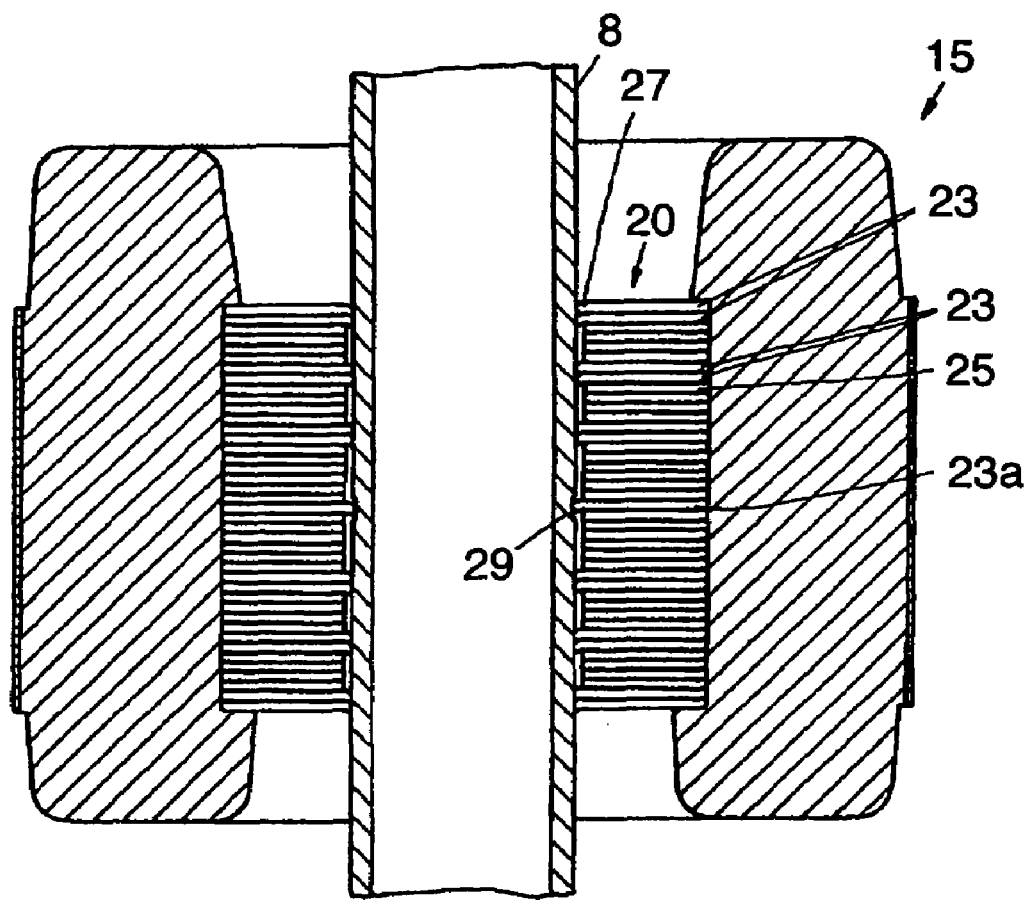
FIG. 6 is a fourth embodiment of a rotor with shaft.

FIG. 6 shows a further embodiment, in which the same parts have the same reference numbers.

In order to increase the jamming forces between the rotor 15 and the shaft 8, the rotor lamination 20 firstly has an increased number of sheet plates 23 of the first group. Shown are a total of twelve sheet plates 23 of the first group, which are distributed on 6 pairs. That is, in the first group, the sheet plates 23 bear on each other two and two. Two immediately neighbouring sheet plates 23 are possible, as long as the mounting forces are sufficient for flexibly deforming their end areas 27.

Between the individual sheet plates 23 or the sheet plates 23 stacked in pairs, at least one sheet plate 25 of the second group is provided. The free space provided by the sheet plate 25 or sheet plates 25 enables the adoption of the deformed end areas 27 of the sheet plates 23 of the first group.

Also here a safety sheet plate 23a of the first group is provided, which engages in the recess 29 of the shaft 8 to prevent the rotor 15 from sliding off from the shaft 8.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A rotor arrangement for an electrical drive motor of a compressor, comprising:
    a rotor having a rotor lamination of stacked sheet plates, an axial recess of the rotor lamination being formed by openings in adjacent sheet plates; and
    a drive shaft inserted in the axial recess of the rotor lamination and unrotatably connected with the rotor lamination;
    wherein openings of different sizes are provided in the sheet plates, at least two sheet plates forming a first group, each having an opening, which is elastically widened and conically deformed around the shaft, the remaining sheet plates forming a second group, each having an opening, which is larger than the cross-section of the shaft.

2. The rotor arrangement according to claim 1, wherein at least the openings in the sheet plates of the first group and the cross-section of the shaft are circular.

3. The rotor arrangement according to claim 1, wherein the opening edges of the sheet plates in the first group are hooked on the surface of the shaft against the direction of pushing.

4. The rotor arrangement according to claim 1, wherein sheet plates in the first group are located in the area of the axial ends of the rotor lamination.

5. The rotor arrangement according to claim 4, wherein at least one sheet plate of the first group is located in the area of the axial centre of the rotor lamination.

6. The rotor arrangement according to claim 1, wherein the shaft has at least one indentation, in which a sheet plate of the first group engages.

7. The rotor arrangement according to claim 6, wherein the indentation has the form of a circumferential groove.

8. The rotor arrangement according to claim 6, wherein the indentation is located at the end of the rotor lamination, which will first overlap with the shaft during mounting on the shaft.

9. The rotor arrangement according to claim 1, wherein sheet plates of the first group bear on each other in pairs.

* * * * *